Dec. 19, 1967     M. E. LIESSE     3,358,474
SPACE LIGHTING FITTINGS
Filed March 16, 1966
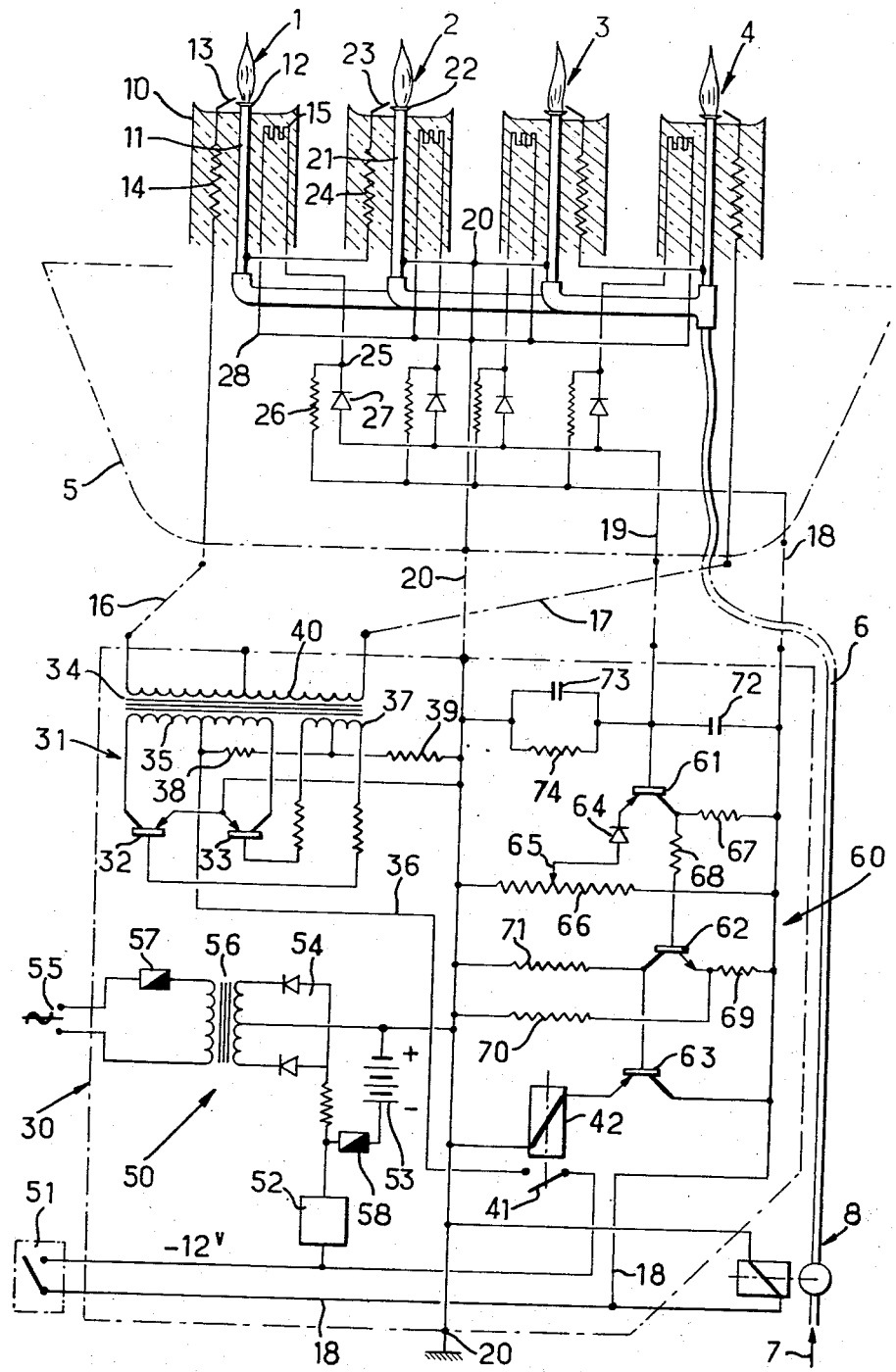
INVENTOR
MAURICE ETIENNE LIESSE
By Young & Thompson
ATTYS.

United States Patent Office 3,358,474
Patented Dec. 19, 1967

3,358,474
SPACE LIGHTING FITTINGS
Maurice Etienne Liesse, 2 Rue Diderot,
Hauts-de-Seine, Champigny, France
Filed Mar. 16, 1966, Ser. No. 534,867
Claims priority, application France, Mar. 18, 1965, 9,684;
Mar. 11, 1966, 53,042
3 Claims. (Cl. 67—14)

ABSTRACT OF THE DISCLOSURE

An illuminating gas light has an electric spark ignition, a gas supply control, a flame detector, and a control switch. When the switch is turned on, the gas supply is opened and the ignition is actuated. If the flame goes out while the switch is still on, the flame detector reactuates the ignition.

---

This invention relates to improvements in space lighting fittings.

In interior decoration, light fittings such as pendants or chandeliers are used to simulate old-fashioned lighting systems such as oil lamps, paraffin lamps or candles, because of the intimate atmosphere they engender.

When electricity was originally introduced, efforts were made to eliminate the shortcomings of the old-fashioned fittings whilst retaining the aesthetic advantages of lighting by naked flames.

The main object of the present invention is to provide a lighting fitting having at least one gas lighting nozzle with electric spark ignition means remotely controlled by an electric switch.

According to the present invention, a lighting fitting comprises at least one gas lighting burner, an electric spark ignition device associated with said burner, a gas supply pipe connected to said burner, a gas cock in said pipe, an electric ignition circuit mounted in combination with said cock, an ignition voltage generator in the form of a low voltage electric supply circuit electrically connected to said first circuit and co-operating with a flame detector, and an overall switch operable to actuate simultaneously the said low tension supply circuit and said cock.

Each of the remotely ignited flames remains under constant supervision due to the positive interlinkage between the ignition voltage generator and the flame detector, so that its re-ignition occurs automatically as long as the actuating switch is left closed.

In order that the invention may be more fully understood an embodiment in accordance therewith will now be described by way of example with reference to the accompanying drawing which shows diagrammatically a lighting fitting.

The drawing shows four gas lighting burners 1 to 4 grouped in a lighting fixture 5 supplied with gas in parallel through a pipe 6 connected to a source of gas represented by the arrow 7, through an electromagnetic valve 8. Each of the burners 1 to 4 is incorporated in a decorative fitting 10 of translucent plastic material in imitation of a candle or taper for example. Each of the lighting burners comprises a metallic or metallised burner tube 11 terminating in an end-piece 12 which is convexly shaped and has sharp edges. Each of these tubes is co-ordinated with a fine electrode such as 13 the extremity of which, ground to a point, is close to the opening of the end-piece or tip so that a spark struck between it and the sharp edge of the tip passes through the marginal part at the base of the flame or at the base of the gas jet issuing from the tip. Each such electrode as 13 is connected in series with a resistance 14 of high rating (1 megohm for example), which is advantageously embodied within the mass of the fitting 10. In this fitting is also embedded, close to its upper surface, a flame-sensitive cell 15 arranged with its sensitive surface facing towards the flame.

A high-tension ignition circuit is formed between an appropriately insulated high-tension supply wire 16 and an earth wire 20, this circuit comprising, beginning with the feed wire 16: the resistance 14, the electrode 13 and the tube 11 of the burner 1 which is insulated from earth, then the resistance 24 connected to the tube 11, the electrode 23 and the tube 21 of the burner 2, which is earthed at 20. A symmetrical ignition circuit is formed for the burners 3 and 4 between the earth wire 20 and a second high-tension supply wire 17.

Each of the cells 15 has one of its terminals 25, connected through a resistance 26 to a low tension supply wire 18 (−12 v. for example). The same terminal 25 of each of the cells 15 is connected on the other hand, to the cathode of a diode 27, the anodes of all these diodes 27 being connected to a second low-tension wire 19, described as the warning wire. The other terminal 28 of each of the cells 15 is connected to the earth wire 20.

The lighting fitting thus equipped is connected to a supply and control box 30 by a lead or multicore cable comprising the two high-tension supply wires 16, 17, the low-tension supply wire 18, the warning wire 19 and the earth wire 20. The source of high ignition voltage is formed by a multivibrator 31 comprising a conventional circuit with two transistors 32–33 having a booster or step-up transformer 34, comprising three symmetrical windings with center tapping, that is to say: a primary winding 35, whose center tapping is supplied with low-tension by the wire 36, a reaction winding 37 whose center tapping is raised to a definite polarising potential by a resistance bridge 38–39 set up between the feed wire 36 and the earth wire 20, and a secondary high-tension winding 40 the center tapping of which is connected to earth while its two extreme terminals are connected to the corresponding wires 16 and 17.

The feed wire 36 of the oscillator is connected to the low-tension feed wire 18 by the normally open contact 41 of a so called ignition relay 42, situated at the output end of a so-called control amplifier 50, to be described.

The low-tension feed wire 18, which equally supplies the energising coil of the electromagnetic valve 8, is connected to a source of low-tension supply 50 through a switch 51 for general control of the system and through a thermal contact-breaker 52. The source of low-tension supply 50 is advantageously formed by the parallel connection of an accumulator battery 53 and a rectifying bridge 54 supplied from the A.C. grid 55 through a step-down transformer 56, safety fuses 57, 58 being interposed in the primary circuit of the transformer 56 on the one hand, and in the output from the battery 53 on the other.

The control amplifier 60 comprises, between the warning wire 19 representing its input terminal, and the ignition control relay 42 representing its output, an input or detector stage equipped with a transistor 61, an amplification stage comprising a transistor 62, and an output stage with a power transistor 63. The voltage prevailing between the warning wire 19 and the earth wire 20 is applied to the base of the detecting transistor 61 whose emitter is connected by a diode 64 to the sliding contact 65 of a polarising or threshold adjustment potentiometer 66. The collector of the transistor 61, charged through a resistance 67, is coupled by a linking resistance 68 to the base of the amplifying transistor 62 whose emitter is polarised by a resistance bridge 69–70 whilst its collector charged through the resistance 71 acts on the base of the power transistor 63 which feeds the ignition relay 42.

The warning wire 19 forming the input of the amplifier is coupled to the feed wire 18 by a condenser 72 and to the earth wire 20 by a condenser 73 shunted by a resistance 74, the assembly 73–74 forming a time-lagging element.

The operation of the above described device as a whole is as follows:

The gas lighting fixture is controlled by the switch 51, which in essence is a conventional wall switch of an electrical lighting system; it suffices to close the switch 51 to cause ignition, and to open it to cause quenching of the flames.

Closing the switch 51 causes the voltage supplied by the source 50 to be applied to the feed wire 18. The current thus passing through the electromagnetic valve 8 causes the latter to open and the burners 1 to 4 to be supplied with gas. As will be apparent the control amplifier 60 ensures supply to the ignition relay 42 throughout the time elapsed until all the flames have been ignited. Throughout this period, the relay 42 keeps the contact 41 closed and ensures operation of the multivibrator 31; sparks are maintained on the ignition electrodes 12 and 23 of the burners 1 and 2 on the one hand, as well as on the corresponding electrodes of the burners 3 and 4, on the other hand.

The warning wire 19 is connected by the corresponding diodes 27 to the terminal 25 of each of the cells 15 and each of the terminals 25 is connected to the low-tension feed wire 18 on the one hand, by the constant resistance 26, and to earth on the other hand, by the cell 15. When the latter is illuminated in appropriate manner, the potential of the corresponding point 25 is thus brought close to earth potential; when all the flames are alight, the cathode of each of the diodes 27 is thus brought to a potential close to earth potential; the diodes 27 are blocked, without any current flowing into the base of the detecting transistor 61. No signal being received at the input of the amplifier 60, the ignition relay 42 relaxes, interrupting the high-tension supply, If any one of the flames were to be extinguished, the value of the corresponding cell 15 is restored to a high level and the potential of the corresponding point 25 differs from earth potential and comes close to the potential of the feed wire 18, being a negative potential in this instance; beyond a certain threshold, which is established by the position of the sliding contact 65 of the threshold control potentiometer 66, the corresponding diode 27 becomes conductive at the same time as the diode represented by the emitter and the base of the detecting transistor 61; the current thus engendered, amplified by the control amplifier 60, causes a reconnection of the ignition relay 42 to occur.

The device may be embodied in or in combination with a conventional electrical lighting system; electric light bulbs may be hidden within the lighting fixture 5 to enhance and highlight the lighting provided by the gas flames; or else, a background of electrical lighting may be set up in the room either with conventional bulbs, or with fluorescent strip lighting or the like. In all cases, the photo-resistant cells 15 will normally be exposed not only to the light from the corresponding gas flames, but to a certain level of background illumination, which may be of cyclic nature in the case of neon tubes for example. The time constant of the time-lagging element formed by the condenser 73 and the resistance 74 is chosen in such manner as to reduce the sensitivity of the detection circuit to the light thus modulated. Experience shows that the combined action of this time-lagging and threshold ajustment provided by the potentiometer 66 renders it possible to detect the extinction of any one of the flames in unexceptionable manner; correct discrimination has thus been made possible, even in a particularly difficult case in which the lighting fixture is set up beneath a ceiling light fitting equipped with neon tubes and producing powerful background illumination. The safety of the system is enhanced still more by the presence of the thermal contact-breaker 52, which may for example be set to operate if the electrical part of the system remains live for a predetermined period, of 30 seconds for example. It is obvious that whenever the contact-breaker comes into action, or whenever the low-tension source of current 50 fails, the electromagnetic valve 8 ensures interruption of the supply of gas.

It will be noted that in case of electric supply mains failure, the system can continue to operate and thus to fulfil the function of emergency lighting in all safety, by the battery 53.

A lighting system may be in an installation in series with a variable number of flames, and their operation may be controlled by devices exploiting other phenomena than the photo-electric effect; heating may be checked by means of thermocouples or thermoresistors or the ionisation caused by the flame for example. The electromagnetic valve may be replaced by a simple manually operated tap or cock co-ordinated or synchronised with the operation of the switch 51.

I claim:

1. A space lighting fitting comprising at least one gas lighting burner, an electric spark ignition device associated with said burner, a gas supply pipe connected to said burner, a gas cock in said pipe, an electric ignition circuit mounted in combination with said cock, an ignition voltage generator in the form of a low-voltage electric supply circuit electrically connected to said first circuit and co-operating with a flame detector, and an over-all switch operable to actuate simultaneously the said low-voltage supply circuit and said cock, said flame detector emitting a signal in the absence of flame which is blocked in the presence of flame and is applied to an ignition relay preceded by a control amplifier comprising an input stage of variable threshold, the detection circuit associated with each said burner comprising a diode having one of its terminals connected through an element sensitive to said burner flame to a reference potential and through a constant resistance to a specific potential, its other terminal being connected to the input of said control amplifier.

2. A space lighting fitting comprising at least one gas lighting burner, an electric spark ignition device associated with said burner, a gas supply pipe connected to said burner, a gas cock in said pipe, an electric ignition circuit mounted in combination with said cock, an ignition voltage generator in the form of a low-voltage electric supply circuit electrically connected to said first circuit and cooperating with a flame detector, an over-all switch operable to actuate simultaneously the said low-voltage supply circuit and said cock, each said burner comprising a feed tube within a molded translucent mount, and a flame-sensitive cell forming part of said flame detector and carried by said mount.

3. A space lighting fitting according to claim 2, wherein each said burner comprises a feed tube within a molded translucent mount and a flame-sensitive cell forming part of said flame detector and insert-molded in the mass of said mount, and an ignition electrode associated with a series resistance and insert-molded in said mass.

References Cited

UNITED STATES PATENTS

| | | | |
|---|---|---|---|
| 2,964,102 | 12/1960 | Cassell et al. | 158—125 |
| 3,185,203 | 6/1965 | Hassa | 158—125 |
| 3,247,887 | 4/1966 | Matthews | 158—125 |

FREDERICK L. MATTESON, Jr., *Primary Examiner.*

E. G. FAVORS, *Assistant Examiner.*